United States Patent [19]

Cournoyer

[11] 3,974,733

[45] Aug. 17, 1976

[54] FIFTH CHORDS INDICATING AND MUSIC TEACHING DEVICE

[76] Inventor: Georges A. Cournoyer, 480 Chapman St., St. Bruno, Quebec, Canada

[22] Filed: Dec. 20, 1974

[21] Appl. No.: 534,910

[52] U.S. Cl. .................................................. 84/473

[51] Int. Cl.$^{2}$ .......................................... G09B 15/02

[58] Field of Search ............. 84/470, 471, 473, 474, 84/477–482

[56] References Cited

UNITED STATES PATENTS

| | | | |
|---|---|---|---|
| 2,502,300 | 3/1950 | Young | 84/473 |
| 3,592,099 | 7/1971 | Gibby | 84/473 |

*Primary Examiner*—John Gonzales

[57] ABSTRACT

A device adapted to teach music and to indicate musical data, in particular the possible fifth chords, their localizations, their component thirds, their qualifications and the transposition from one key to another. This device includes a base member having a groove into the front face, a ruler slidable endwise in this groove, and a third member defining a transparent face slidable over the base member and the ruler; a chromatic scale is marked on the ruler; the diatonic scales of the major and minor modes are marked on the base member along the opposite edges respectively of the groove. A row of color-coded degree marks is arranged along each diatonic scale and distinctively identify the possible qualification of the fifth chord which may be played on the fundamental note corresponding to any degree, and indicators of the intervals of the fifth chords of any possible qualification are marked on the transparent face and arranged to transversely point the notes on the chromatic scale which correspond to a fifth chord of selected qualification and fundamental note.

6 Claims, 5 Drawing Figures

FIFTH CHORDS INDICATING AND MUSIC TEACHING DEVICE

This invention relates to a device adapted to teach music and, more particularly, to a device of the slide rule type adapted to indicate the fifth chords and to transpose from one key to another.

There have anteriorly been proposed related devices which display fifth chords but which are limited to only a few selected chords and are not giving the relationship between all possible qualifications of the fifth chords.

It is a general object of the present invention to provide a music teaching and indicating device of the above type, which is of simple construction and easy to read and yet which is adapted to indicate all the possible fifth chords and possible localisations, component thirds and qualifications of the latter for both the major and the minor modes.

It is another general object of the present invention to provide a music teaching and indicting device of the above type, which is adapted to readily transpose from one key to another and which is particularly adapted to teach the relationship between the fifth chords of different qualifications.

The above and other objects and advantages of the present invention will be better understood in the light of the following detailed description of a preferred embodiment thereof which is illustrated, by way of example, in the accompanying drawings, wherein.

Figure 2:
FIG. 2 is an end view of the device as seen from the right in FIG. 1.
Figure 1:
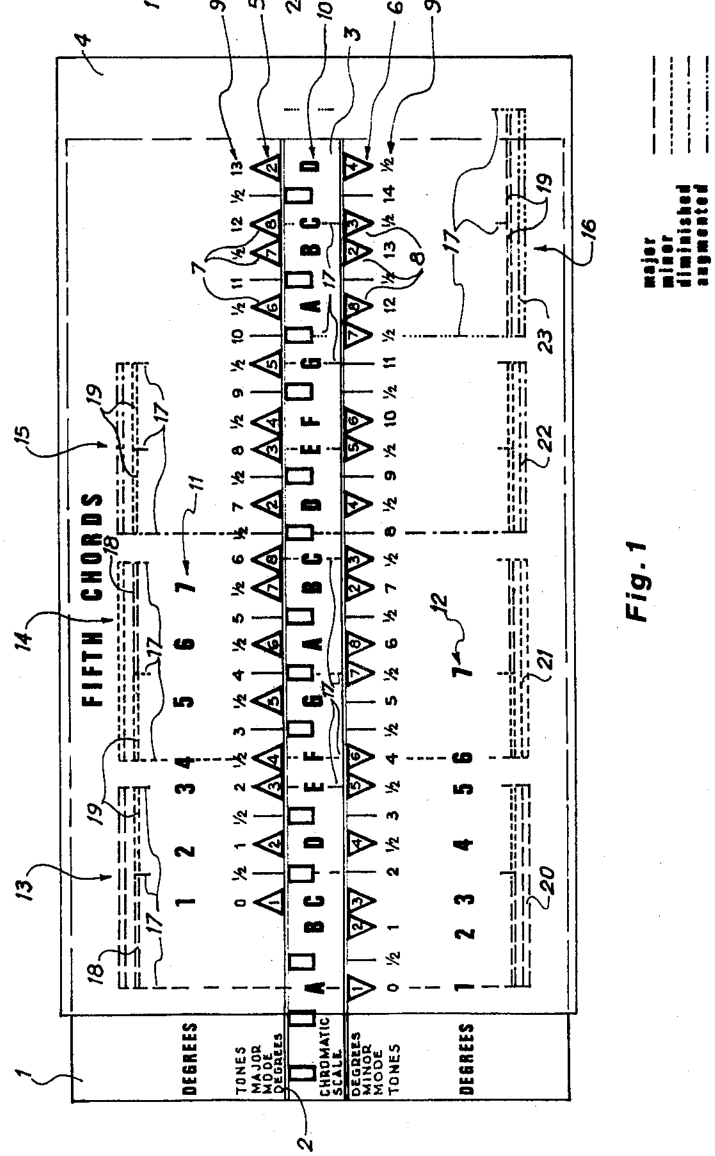
FIG. 1 is a plan view of a fifth chords teaching device according to the invention.

The illustrated musical data teaching and indicating device includes a base member 1, in the form of a plate having a rectilinear groove 2 in the front face thereof. A ruler 3 is slidable endwise in the groove 2. A transparent sleeve 4 is slidable over the base member 1 and the ruler 3 and thus defines a front transparent face or window overlying the front face of both the base member 1 and the ruler 3.

The base member 1 has the diatonic scales 5 and 6 in the major and the minor modes marked along the opposite edges respectively of the groove 2. These diatonic scales are graduated in equidistant tonal relationship. Triangular marks 7 and 8 are placed along the diatonic scales 5 and 6, respectively to clearly identify the characteristic degrees thereof. A line or row 9 of tone numbers is juxtaposed to each diatonic scale with these numbers serially arranged from left to right to readily give the length of an interval.

The chromatic scale 10 is marked on the front face of the ruler 3 with the same equidistant tonal spacing relationship as the diatonic scales. A conventional keyboard, such as the piano keyboard with the white and black keys, is marked on the ruler 3.

Rows of color coded degree numbers 11 and 12 are aligned along the diatonic scales 5 and 6 respectively. Each degree number of the rows 11 and 12 is coded with a particular color which distinctively identifies the qualification of the fifth chord which can be played on this degree and any selected fundamental note which is in registry therewith upon selection of a particular key.

It must be noted that other coded marks could be used to identify the playable fifth chords of these degrees.

Color coded marks 13, 14, 15, and 16 are provided on the transparent front face of the sleeve member 4 and are adapted to indicate the fifth chords of any possible qualification which can be played. It must be noted that the color coding is the same for the fifth chord indicators 13, 14, 15, and 16 as for the degree numbers 11 and 12. Each fifth chord indicator includes pointers 17 to indicate the distinctive note of any fifth chord. The pointers 17 also serve to divide the fifth chords into their component major thirds 18 and minor thirds 19.

It must be noted that the fifth chord indicator 13 is adapted to indicate and teach the major fifth chords and includes the lines 18, 19, and 20 of appropriate tonal span and accordingly coded to indicate the qualifications of the corresponding intervals. Similarly, the fifth chord indicators 14, 15, and 16 are adapted to indicate and teach the minor, the diminished and the augmented fifth chords respectively and include the lines 18, 19, 21, 22, and 23 of appropriate tonal span and accordingly coded to indicate the qualification of the corresponding intervals.

With the aforedescribed device, it is possible to analyze each of the fifth chords which may be produced on each of the degrees of both diatonic scales in any of the fifteen keys.

Figure 3:
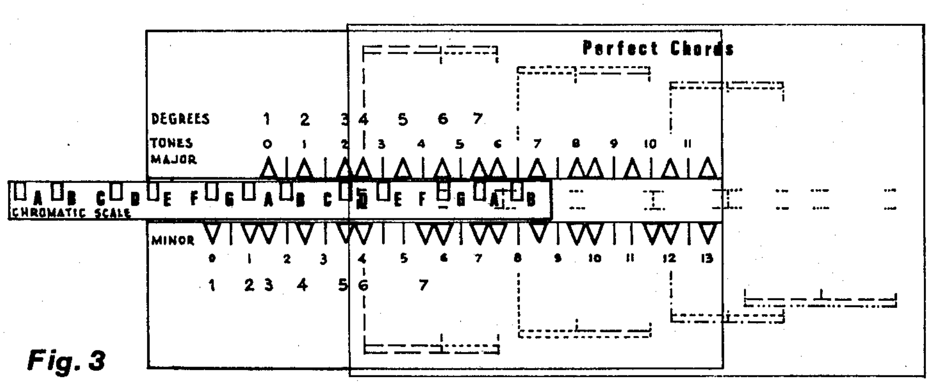
FIGS. 3, 4, and 5 are partial views of FIG. 1 illustrating the use of the teaching device to define fifth chords.

As shown in FIG. 3, the major perfect chord of D may be defined by placing the left pointer 17 of the indicator 13 in registry with the fourth degree of the diatonic scale 5 in the key of A for the major mode and by placing the ruler 3, such that the note D also registers with this pointer 17. Thus, the three pointers 17 of the fifth chord indicator 13 indicate the distinctive notes D, F sharp, and A as the notes of the desired fifth chord. It must be noted that the same chord is simultaneously read on the sixth degree of the diatonic scale 6 in the key of F sharp for the minor mode.

Figure 4:
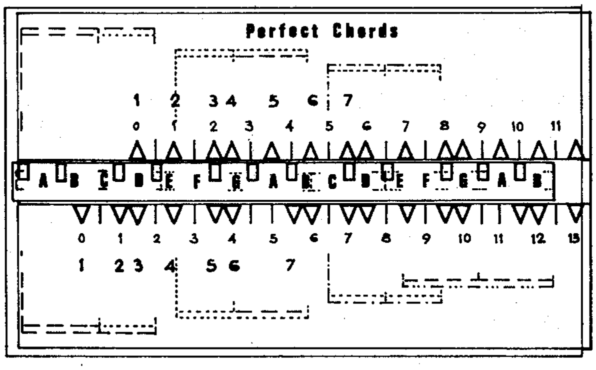

As shown in FIG. 4, the minor perfect chord of E is defined (a) by sliding the member 4 to align the leftmost pointer 17 of the chord indicator 14 with the fourth degree of the diatonic scale 6 and by also aligning the note E of the chromatic scale with the same degree. Thus, this fifth chord is found in the key of B in the minor mode and the pointers 17 of the indicator 14 indicate the notes E, G, and B as forming part of this chord. The same chord may simultaneously be read, without moving the ruler 3, in the key of D of the major mode.

Figure 5:
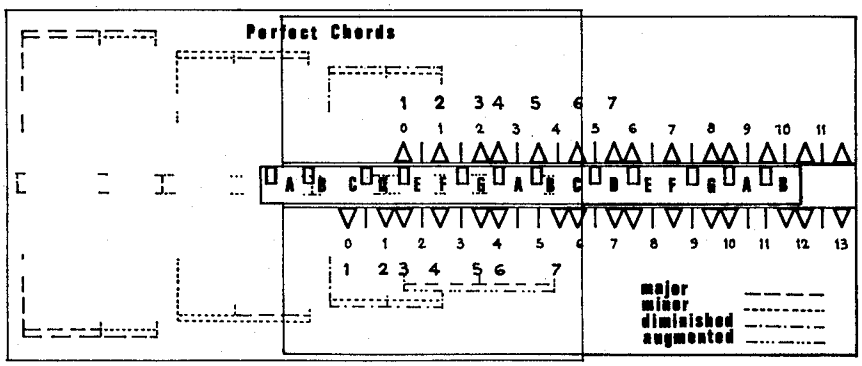

As shown in FIG. 5, the augmented fifth chord of E flat is defined only in the minor mode by sliding the leftmost pointer 17 of the chord indicator 16 in alignment with the degree number 3 and by sliding the ruler 3 for registry of E flat with this degree 3. The indicator 16 indicates that the notes E flat, G, and B form this chord and the alignment of the note C with the first degree of the corresponding mode indicate that this fifth chord is found in the key of C.

The construction of each fifth chord may be analysed in relation to the component thirds thereof by use of the corresponding lines 18 and/or 19.

It must be noted that ruler 3 with the chromatic scale thereon allow to read and transpose into any of both diatonic scales in any of the fifteen keys.

It must be noted that the diatonic scale 5 for the major mode laterally registers with the diatonic scale 6 at a one and a half interval lag with respect to the latter to allow lateral registry of the degree marks 2 and 4 of the major mode with the degree marks 4 and 6 respectively of the minor mode to obtain determination of a major or minor chord simultaneously in both modes. This is possible since on both the second degree of the major mode and the fourth degree of the minor mode, a minor fifth chord may be obtained and on both the fourth degree of the major mode and the sixth degree of the minor mode, a major fifth chord may be obtained.

Referring to the above example illustrated in FIG. 3, it is known in the art that a major perfect fifth chord may be obtained on either the first, fourth or fifth degree in the major mode. The fourth degree has been selected to simultaneously obtain the afore-described alignment of the sixth degree of the minor mode with the fourth degree of the major mode. In other words, with the afore-mentioned one and a half interval lag only, this alignment with the fourth degree of the major mode and the sixth degree of the minor mode allows to simultaneously obtain the same major perfect fifth chord in both modes.

For similar reasons, the fourth degree of the minor mode has been selected, since only this alignment of the fourth degree of the minor mode with the second degree of the major mode allows to simultaneously obtain the same minor fifth chord in both modes.

It is known in the art which degree may be used as the fundamental note for a major perfect, a minor, an augmented, or a diminished fifth chord. More precisely, it is known in the art that the first, fourth and fifth degrees of the major mode and the fifth and sixth degrees of the minor mode may constitute the fundamental note of a major perfect fifth chord. These degrees are distinctively written in a particular color, say red. Similarly, the second, third and sixth degrees of the major mode and the first and fourth degrees of the minor mode may form the fundamental note of a minor fifth chord and are written in a particular color, say blue. The seventh degree of both modes and the second degree of the minor mode are used for the diminished fifth chord and are distinctively color coded, say by being written in green. The third degree of the minor mode is used for the augmented fifth chord and is distinctively color coded, say by being written in yellow.

Obviously, any other color code may be used but, preferably, the same color code is used to identify the qualification of any component third of the fifth chord indicators 13, 14, 15, and 16 and to identify the degree marks 11 and 12, as above described.

It must be noted that the base member 1 constitutes a flat base having a front face and the rectilinear groove 2 formed therein, dividing the latter into two separate areas defining a major mode zone above the groove 2 and ruler 3 and a minor mode zone below the groove and ruler. The degree marks 11 and the diatonic scale 5 for the major mode are positioned in the major mode zone separately from the diatonic scale 6 and the degree marks 12 for the direct minor mode which are positioned in the minor mode zone.

I claim:

1. A fifth chords teaching and indicating device comprising a base member, a second and a third members both movably connected to said base member and independently movable relative to the latter, a chromatic scale having the musical notes equidistantly marked on one face of said second member and displaceable endwise relative to said base member, one diatonic scale marked on said base member laterally adjacent to said chromatic scale, one row of degree marks extending on said base member along said diatonic scale and including a code distinctively identifying the fifth chord of which qualification, as diminished, augmented, major and minor, can be played on any of the corresponding degrees of one octave of the chromatic scale, and at least one fifth chord indicator marked on said third member laterally adjacent said row of degree marks, displaceable with the third member along the chromatic scale, and including pointers of distinctive notes of said one fifth chord pointing toward the chromatic scale and forming dividers located at the specific degrees of the ends of the component thirds of the fifth chord, and a qualification code distinctively identifying the qualification of each of said component thirds as a diminished, augmented, major or minor.

2. A fifth chord indicating device as defined in claim 1, wherein said one indicator constitutes a first indicator indicating the distinctive intervals of the major perfect chord, and said third member further includes a second, a third, and a fourth indicators indicating the distinctive intervals of the minor perfect, the diminished fifth, and the augmented fifth chords respectively and said codes are the same color code.

3. A fifth chords indicating device as defined in claim 2, wherein said one diatonic scale is marked in the major mode, said base member includes another diatonic scale marked thereon in the minor mode, said one row of degree marks are coded to identify the possible qualification in relation to any corresponding degree of the major mode, and another row of degree marks are arranged on said base member along said another diatonic scale and are coded to identify the possible qualification in relation to any corresponding degree of the minor mode.

4. A fifth chords indicating device as defined in claim 3, wherein said base member has a groove into said one face thereof, said diatonic scales are marked along the opposite edges of said groove, said second member constitutes a ruler slidable endwise in said groove, and said third member includes a transparent face slidable over said first and said second members and having said indicators marked thereon in overlying relationship relative to said one face of said first and said second members with said pointers extending across said rows of degree marks, said chromatic scale, and said diatonic scales.

5. A fifth chords indicating device as defined in claim 2, wherein said one diatonic scale is marked in the major mode, said base member includes another diatonic scale marked thereon in the direct minor mode, and said one diatonic scale laterally registers with said another diatonic scale at a one and a half interval lag relative to the latter.

6. A fifth chords indicating device as defined in claim 5, wherein said base member constitutes a flat base having a front face and a rectilinear groove, dividing the front face into two separate areas defining a major mode zone and a minor mode zone on opposite sides respectively of said groove, said second member constitutes a ruler slidable endwise in said groove, said one diatonic scale and the degree marks for the major mode are positioned in the major mode zone separately from said another diatonic scale and the degree marks for the minor mode are positioned in the minor mode zone.

* * * * *